United States Patent
Falk et al.

(10) Patent No.: US 11,190,455 B2
(45) Date of Patent: Nov. 30, 2021

(54) DECODING OF A MEDIA STREAM AT A PACKET RECEIVER

(71) Applicant: Telefonaktiebolaget LM Ericsson (publ), Stockholm (SE)

(72) Inventors: Tommy Falk, Spånga (SE); Alfred Samuelson, Sundbyberg (SE); Magnus Westerlund, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/958,192

(22) PCT Filed: Feb. 28, 2018

(86) PCT No.: PCT/EP2018/054884
§ 371 (c)(1),
(2) Date: Jun. 26, 2020

(87) PCT Pub. No.: WO2019/166079
PCT Pub. Date: Sep. 6, 2019

(65) Prior Publication Data
US 2021/0075736 A1  Mar. 11, 2021

(51) Int. Cl.
*H04L 12/823* (2013.01)
*H04L 29/06* (2006.01)
*H04L 12/841* (2013.01)

(52) U.S. Cl.
CPC .......... *H04L 47/32* (2013.01); *H04L 47/283* (2013.01); *H04L 65/60* (2013.01)

(58) Field of Classification Search
CPC ........ H04L 47/32; H04L 47/283; H04L 65/60
See application file for complete search history.

(56) References Cited

U.S. PATENT DOCUMENTS

| | | | | |
|---|---|---|---|---|
| 8,176,154 | B2* | 5/2012 | Minhazuddin | ...... H04L 41/0816 709/223 |
| 8,379,083 | B1 | 2/2013 | Jafari et al. | |
| 9,258,333 | B2* | 2/2016 | Bichot | ............... H04L 65/1046 |
| 9,788,054 | B2* | 10/2017 | Kouncar | ............ H04N 21/4335 |

(Continued)

OTHER PUBLICATIONS

Lennox, J. et al., "A Taxonomy of Semantics and Mechanisms for Real-Time Transport Protocol (RTP) Sources", Internet Engineering Task Force (IETF), Nov. 1, 2015, pp. 1-46, RFC 7656, IETF.

(Continued)

*Primary Examiner* — Nam T Tran
(74) *Attorney, Agent, or Firm* — Coats + Bennett, PLLC

(57) ABSTRACT

There is provided mechanisms for decoding a media stream. A method is performed by a packet receiver. The method comprises receiving packets. The packets have been transmitted by a packet transmitter. The packets define the media stream and each packet comprises encoded media. The method comprises decoding the encoded media into at least a first decoded version and a second decoded version. For the first decoded version only a subset of the packets decoded for the second decoded version are decoded. The subset includes only those of the packets that are received within a first threshold time delay from having been transmitted by the packet transmitter.

15 Claims, 5 Drawing Sheets

(56) References Cited

U.S. PATENT DOCUMENTS

| | | | |
|---|---|---|---|
| 2006/0007943 A1* | 1/2006 | Fellman | H04L 1/1835 370/400 |
| 2007/0268887 A1* | 11/2007 | Schwartz | H04L 47/32 370/352 |
| 2008/0294789 A1* | 11/2008 | Nassor | H04N 21/2402 709/231 |
| 2017/0086250 A1* | 3/2017 | Singh | H04L 65/80 |

OTHER PUBLICATIONS

Begen, A. et al., "Post-Repair Loss RLE Report Block Type for RTP Control Protocol (RTPC) Extended Reports (XRs)", Internet Engineering Task Force (IETF), Feb. 1, 2010, pp. 1-9, RFC 5725, IETF.

Schulzrinne, H. et al., "Rtp: A Transport Protocol for Real-Time Applications", Network Working Group, Jul. 1, 2003, pp. 1-89, RFC 3550, NWG.

Rosenberg, J. et al., "An Offer/Answer Model with the Session Description Protocol (SDP)", Network Working Group, Jun. 1, 2002, pp. 1-25, RFC 3264, NWG.

Clark, A et al., "RTP Control Protocol (RTCP) Extended Report (XR) Block for Discard Count Metric Reporting", Internet Engineering Task Force (IETF), Sep. 1, 2013, pp. 1-12, RFC 7002, IETF.

Mills, D. et al., "Network Time Protocol Version 4: Protocol and Algorithms Specification", Internet Engineering Task Force (IETF), Jun. 1, 2010, pp. 1-110, RFC 5905, IETF.

Handley, M. et al., "SDP: Session Description Protocol", Network Working Group, Jul. 1, 2006, pp. 1-49, RFC 4566, NWG.

Rey, J. et al., "RTP Retransmission Payload Format", Network Working Group, Jul. 1, 2006, pp. 1-35, RFC 4588, NWG.

Rosenberg, J. et al., "SIP: Session Initiation Protocol", Network Working Group, Jun. 1, 2002, pp. 1-269, RFC 3261, NWG.

Watson, M. et al., "RTP Payload Format for Raptor Forward Error Correction (FEC)", Internet Engineering Task Force (IETF), Aug. 1, 2012, pp. 1-18, RFC 6682, IETF.

Lennox, J. et al., "Source-Specific Media Attributes in the Session Description Protocol (SDP)", Network Working Group, Jun. 1, 2009, pp. 1-18, RFC 5576, NWG.

Huang, R, et al., "RTP Control Protocol (RTCP) Extended Report (XR) for Post Repair Loss Count Metrics", Internet Engineering Task Force (IETF), May 1, 2015, pp. 1-11, RFC 7509, IETF.

Williams, A. et al., "RTP Clock Source Signalling", Internet Engineering Task Force (IEIF), Jun. 1, 2014, pp. 1-30, RFC 7273, IEIF.

Li, A., "RTP Payload Format for Generic Forward Error Correction", Network Working Group, Dec. 1, 2007, pp. 1-44, RFC 5109, NWG.

Friedman, T. et al., "RTP Control Protocol Extended Reports (RTCP XR)", Network Working Group, Nov. 1, 2003, pp. 1-55, RFC 3611, NWG.

* cited by examiner

DECODING OF A MEDIA STREAM AT A PACKET RECEIVER

TECHNICAL FIELD

Embodiments presented herein relate to a method, a packet receiver, a computer program, and a computer program product for decoding a media stream.

BACKGROUND

In communications networks, there may be a challenge to obtain good performance and capacity for a given communications protocol, its parameters and the physical environment in which the communications network is deployed.

For example, one aspect in providing good performance and capacity for a given communications protocol in a communications network is the ability to provide collaborative communications.

Collaboration over networks can generally be divided into two groups; off-line collaboration and real-time collaboration. As an illustrative example, with off-line collaboration, at least two clients could perform changes on a media segment, such as an electronic file, one at a time and the changes are distributed after changes have been done. As a further illustrative example, with real-time collaboration, all clients can follow changes to the document as they are made by another client and may perform changes to the same media segment simultaneously.

For certain type of collaborations, such as providing coordinated real-time media segments between clients distributed at different locations, the perceived delay from one client to another is crucial. The upper limit of the delay in such applications depends on what kind of real-time segments are communicated and if there are some cues used for synchronization between the coordinated real-time media segments between the different clients.

Enabling communications with low latency over packet switched networks of coordinated real-time media segments between clients can be challenging. As an example, the transmission delay is typically unknown and varying over time. Reliable protocols, such as the Transmission Control Protocol (TCP), use retransmission of lost packets in order to guarantee that all information is transmitted from the source client (defining a packet transmitter) to the destination client (defining the packet receiver) without any loss, but this comes at the cost of long latency. A packet retransmission is either triggered by the packet receiver, e.g. if a bit error was detected in a received packet, or by the packet transmitter if no acknowledgement was received from the packet receiver for a particular packet within a certain time. It then takes some time for the packet transmitter to resend the packet.

When low latency is needed, there is generally little time, or even no time, to wait for a retransmission to be performed and most low latency schemes instead rely on Forward Error Correction (FEC) and error concealment in order to correct errors or lost packets as good as possible. FEC adds redundant information to the sent stream of packets, which enables some errors to be detected and corrected by the packet receiver. However, sending redundant information adds to the bitrate and might result in network congestion. Also, FEC does not help if several packets are delayed and there is a gap in the received stream of packets at the packet receiver. In the end, there is a tradeoff between quality and latency, where certain network conditions can only provide a certain media quality for a given latency.

The tradeoff between quality and latency can, to a large extent, be controlled by means of jitter buffer management. In general terms, the jitter buffer buffers a number of packets so as to even out changes in transmission delay, so called jitter. By setting up a comparatively deep jitter buffer, large amounts of jitter can be handled without any lost packets, but the more buffering that is used, the more added latency. The jitter buffer might be configured to be adaptive such that the amount of buffering is controlled by a measure of the current amount of jitter. However, changing the amount of buffering implies that the playout rate of the media (as encoded in the packets) must be changed, which might have a negative effect on the media quality as the media is played out.

Error concealment can improve the media quality when packets are lost or bit errors occur, but in situations where the media quality is expected to be perfect, error concealment is not applicable since there is a risk that there is some amount of distortion introduced into the signal.

In some aspects, the total latency can be determined as the sum of several contributing factors, such as media capturing hardware delay, buffering in software interfacing the capturing hardware, delay coming from framing the media before coding, coding delay, packetization delay in the packet transmitter forming the packet to transmit, transmission delay occurring on the network, jitter buffer buffering, decoding delay, buffering in the software interfacing the rendering hardware, and rendering hardware delay at the packet receiver.

The transmission delay might be unknown and varying over time. There is a theoretical lower limit of the transmission delay due to the speed of light. As an example, if the distance between the packet transmitter and the packet receiver is more than 3000 km, it is impossible to achieve less than 10 ms transmission delay since the speed of light is 299 792 km/s (about 200 000 km/s in optical fibers). Therefore, collaboration that requires very low latency, such as in the order of 50 ms or below, is impossible when the distance between the packet transmitter and the packet receiver is too large.

Although existing mechanisms for reducing latency try to minimize the latency by reducing frame sizes and buffering, there will always be a limit to how low the latency can be whilst still ensuring high enough media quality. If the network conditions are not perfect, there will be a trade-off between latency and quality.

For some scenarios, there are contradicting priorities for the same signal by different consumers of media in the network. Consider, as an illustrative example, the case of a broadcasted concert where the musicians are geographically separated but playing together in real-time. For the real-time collaboration among the musicians, latency is crucial but signal quality can be sacrificed to a certain extent. However, for the broadcasted part a much larger latency can be accepted whilst having higher demands on signal quality. One way to achieve this is to use separate audio streams for collaboration and broadcasting, but this is inefficient from a bandwidth perspective.

Hence, there is still a need for improved mechanisms for handling of both off-line collaboration and real-time collaboration in communications networks.

SUMMARY

An object of embodiments herein is to provide mechanisms that enable efficient simultaneous handling of both real-time collaboration and high-quality media consumption or storage in communications networks.

According to a first aspect there is presented a method for decoding a media stream. The method is performed by a packet receiver. The method comprises receiving packets. The packets have been transmitted by a packet transmitter. The packets define the media stream and each packet comprises encoded media. The method comprises decoding the encoded media into at least a first decoded version and a second decoded version. For the first decoded version only a subset of the packets decoded for the second decoded version are decoded. The subset includes only those of the packets that are received within a first threshold time delay from having been transmitted by the packet transmitter.

According to a second aspect there is presented a packet receiver for decoding a media stream. The packet receiver comprises processing circuitry. The processing circuitry is configured to cause the packet receiver to receive packets. The packets have been transmitted by a packet transmitter. The packets define the media stream and each packet comprises encoded media. The processing circuitry is configured to cause the packet receiver to decode the encoded media into at least a first decoded version and a second decoded version. For the first decoded version only a subset of the packets decoded for the second decoded version are decoded. The subset includes only those of the packets that are received within a first threshold time delay from having been transmitted by the packet transmitter.

According to a third aspect there is presented a packet receiver for decoding a media stream. The packet receiver comprises a receive module configured to receive packets. The packets have been transmitted by a packet transmitter. The packets define the media stream and each packet comprises encoded media. The packet receiver comprises a decode module configured to decode the encoded media into at least a first decoded version and a second decoded version. For the first decoded version only a subset of the packets decoded for the second decoded version are decoded. The subset includes only those of the packets that are received within a first threshold time delay from having been transmitted by the packet transmitter.

Advantageously this provides efficient and simultaneous handling of both real-time collaboration (as represented by the first decoded version) and high-quality media consumption or storage (as represented by the second decoded version) in communications networks.

Advantageously this method and these packet receivers enable low enough latency to be achieved for the first decoded version and high enough quality to be achieved for the second decoded version.

Advantageously, since the two versions come from the same encoded bits, no additional network bitrate is needed in order to provide these two versions compared to a single version other than what is spent on ensuring the high enough quality to be achieved for the second decoded version.

According to a fourth aspect there is presented a computer program for decoding a media stream, the computer program comprising computer program code which, when run on a packet receiver, causes the packet receiver to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
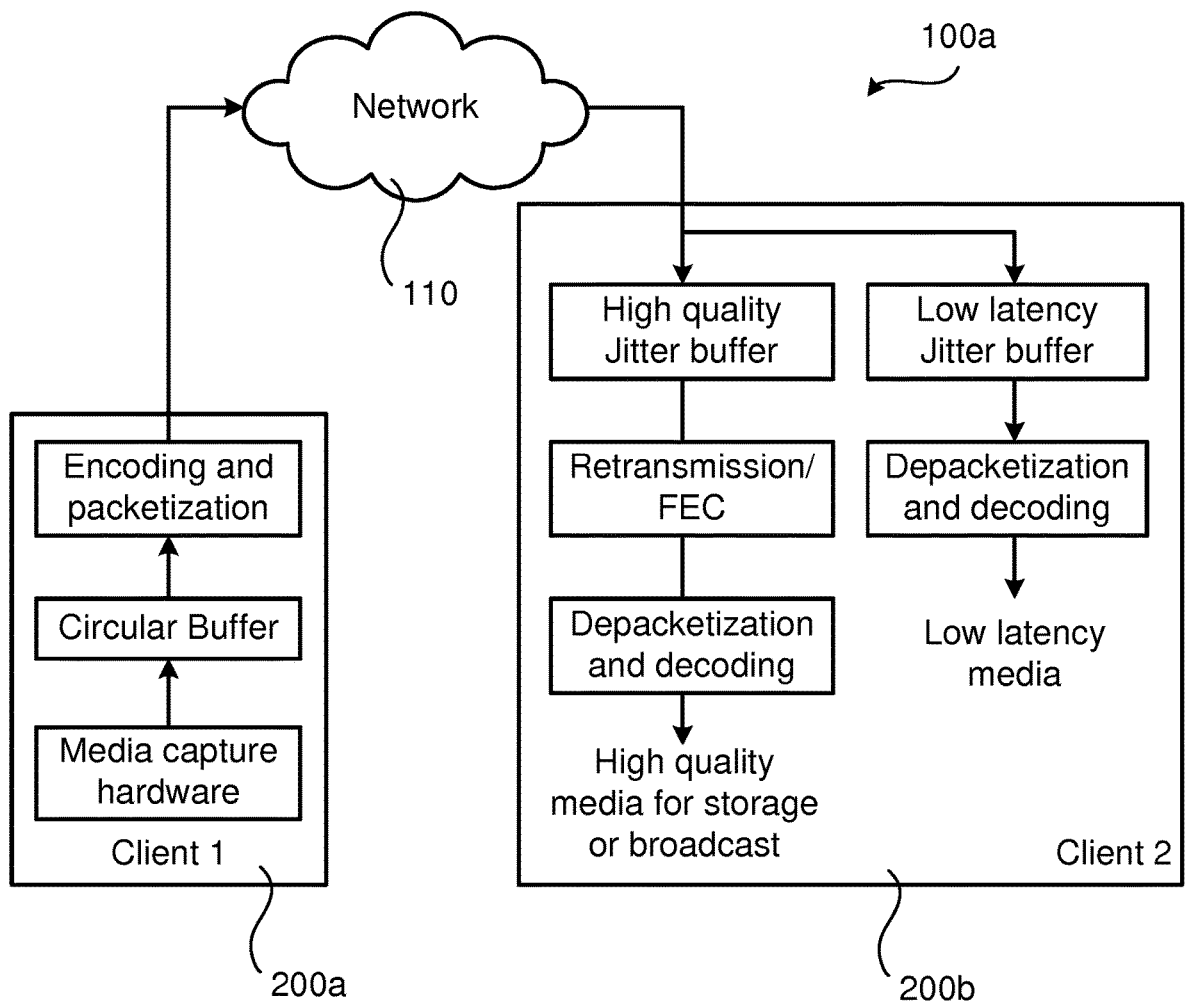
FIGS. 1, 3, 4, 5, 6, and 7 are schematic diagrams illustrating communications networks according to embodiments.

FIG. 1 is a schematic diagram illustrating a communications network 100a where embodiments presented herein can be applied. The communications network 100a comprises a first client, denoted client 1 and a second client, denoted client 2, that are configured to communicate with each other, by means of packet transmission, over a network 110. The network might be wired or wireless, or partly wired and partly wireless.

In the packet transmitter 200a media is captured by media capture hardware and provide to a circular buffer before encoding and packetization. In the packet receiver 200b the received encoded media is provided to a high quality (HQ) jitter buffer and a low latency (LL) jitter buffer, respectively.

There could be different examples of clients, and thus devices in which the packet transmitter 200a and the packet receiver 200b are implemented in. For example, each client might be provided in a mobile station, mobile phone, handset, wireless local loop phone, user equipment (UE), smartphone, laptop computer, tablet computer, network equipped vehicle (such as a car, bus, lorry, truck, vessel, boat, ship, submarine, airplane, or unmanned aerial vehicle), specialized hardware for media recording, or network equipped musical instrument.

For ease of notation but without loss of generality, client 1 acts as a packet transmitter 200*a* and client 2 acts as a packet receiver 200*b*. Although client 1 is implemented as a packet transmitter 200*a* and client 2 as a packet receiver 200*b*, it is understood by the skilled person that either of the clients might selectively act as either a packet transmitter or a packet receiver.

As disclosed above, there is still a need for improved mechanisms for handling of both off-line collaboration and real-time collaboration in communications networks.

The herein disclosed embodiments aim at providing media at the packet receiver 200*b* with both high quality and low latency, for example by duplicating the received packet stream into two receiving chains; one for low latency and one for high quality, as in the example of FIG. 1. The packet receiver 200*b* might thus comprise two decoding chains in order to decode encoded media into at least a first decoded version and a second decoded version. In the illustrative example of FIG. 1, the encoded media stream represented by the packets in the high quality jitter buffer is subject to retransmission and/or FEC as needed before being depacketized and decoded into a high quality media stream suitable for storage or broadcast. In the illustrative example of FIG. 1, the encoded media stream represented by the packets in the low latency jitter buffer is directly depacketized and decoded into a low latency media stream suitable for real-time applications.

The embodiments disclosed herein particularly relate to mechanisms for preparing a received encoded media stream for decoding. In order to obtain such mechanisms there is provided a packet receiver 200*b*, a method performed by the packet receiver 200*b*, a computer program product comprising code, for example in the form of a computer program, that when run on a packet receiver 200*b*, causes the packet receiver 200*b* to perform the method.

Figure 2:
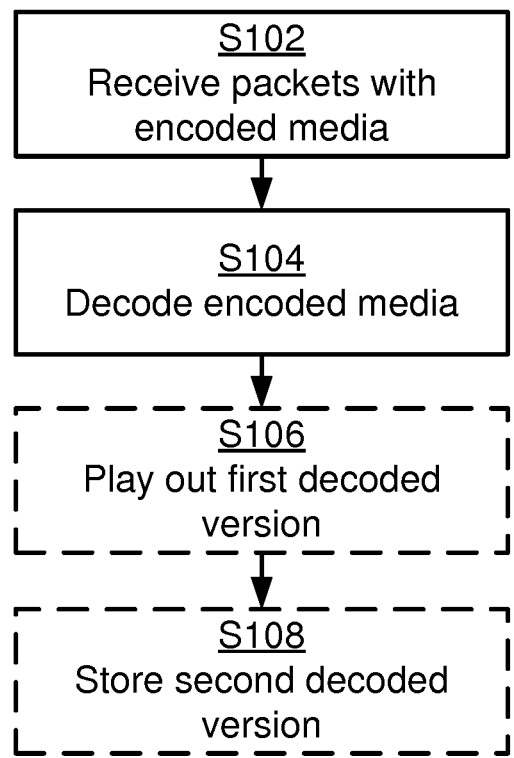
FIG. 2 is a flowchart of methods according to embodiments.

FIG. 2 is a flowchart illustrating embodiments of methods for decoding a media stream. The methods are performed by the packet receiver 200*b*. The methods are advantageously provided as computer programs 1120.

S102: The packet receiver 200*b* receives packets. The packets have been transmitted by the packet transmitter 200*a*. The packets define the media stream. Each packet comprises encoded media.

S104: The packet receiver 200*b* decodes the encoded media into at least a first decoded version and a second decoded version.

For the first decoded version only a subset of the packets decoded for the second decoded version are decoded. The subset includes only those of the packets that are received within a first threshold time delay from having been transmitted by the packet transmitter 200*a*.

According to this method the media stream is on the receiving side thus decoded into at least two versions; one version with low latency and good enough quality (reduced due to occasional failure to deliver in time), and one version with high quality were the amount of buffering is allowed to vary in order to ensure high quality during different network conditions. There is only a single encoding of the media stream at the packet transmitter 200*a*.

Embodiments relating to further details of decoding a media stream as performed by the packet receiver 200*b* will now be disclosed.

Figure 3:
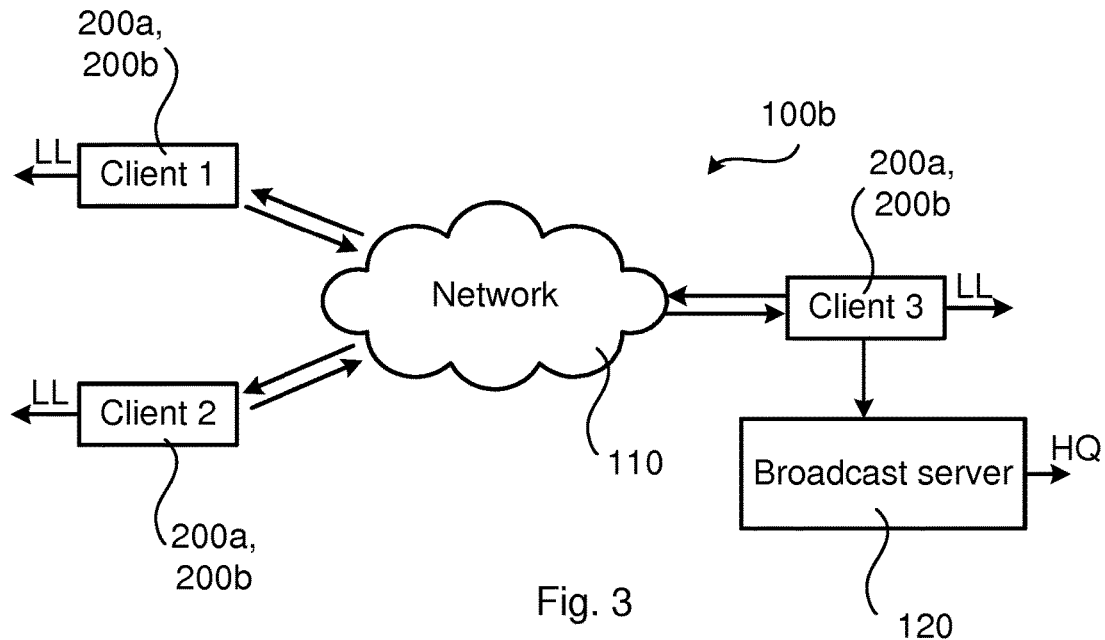
Figure 4:
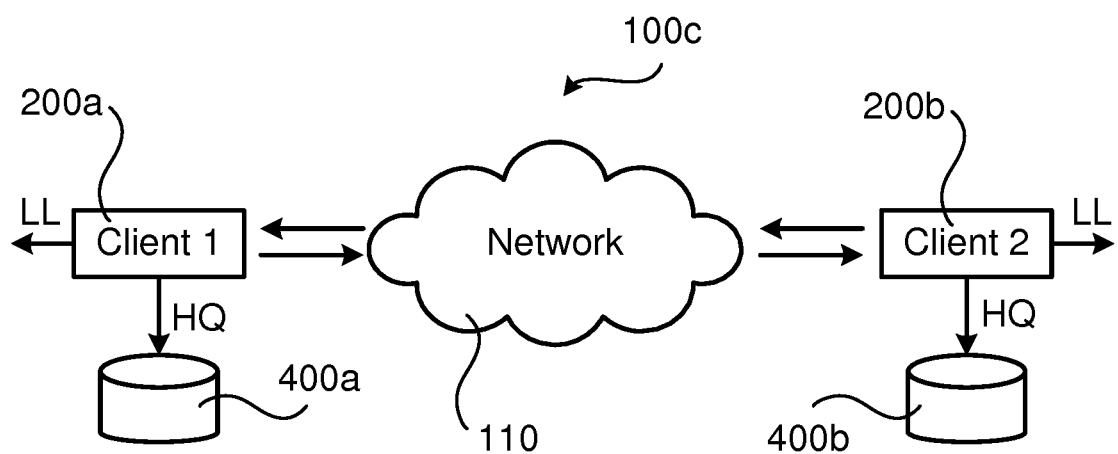

FIG. 3 and FIG. 4 show examples of scenarios where both the high quality and low latency streams are used at the same time. The clients (as represented by a packet transmitter 200*a* and a packet receiver 200*b*) are operatively connected to each other via client software and hardware that handle network connectivity as well as media capture and rendering.

In FIG. 3 is illustrated a communications network 100*b* representing a scenario where client 1 (representing both a packet transmitter 200*a* and a packet receiver 200*b*), client 2 (representing both a packet transmitter 200*a* and a packet receiver 200*b*), and client 3 (representing both a packet transmitter 200*a* and a packet receiver 200*b*) communicate media streams with each other in real-time, thus requiring low latency, as well as providing the media streams to a broadcast server 120 (co-located with client 3) where the latency requirements are substantially lower, but the quality requirements might be higher. The clients can thus use low latency (LL) versions of the media streams while the broadcast server uses a high quality (HQ) version of the media streams.

In FIG. 4 is illustrated a communications network 100*c* representing a scenario where client 1 (representing both a packet transmitter 200*a* and a packet receiver 200*b*) and client 2 (representing both a packet transmitter 200*a* and a packet receiver 200*b*) communicate media streams with each other in real-time, thus requiring low latency, as well as providing the media streams to a respective storages 400*a*, 400*b* where the latency requirements are substantially lower, but the quality requirements might be higher. The clients can thus use low latency (LL) versions of the media streams while the high quality (HQ) version of the media streams is stored in the respective storages 400*a*, 400*b*.

According to an embodiment, for the second decoded version also packets received later than the first threshold time delay from having been transmitted by the packet transmitter 200*a* are decoded.

According to an embodiment, for the second decoded version only those of the packets that are received within a second threshold time delay from having been transmitted by the packet transmitter 200*a* are decoded. The second threshold time delay is longer than the first threshold time delay.

In some aspects each packet has a time indicator. Hence, according to an embodiment, each packet is indicative of a time indicator specifying when in time the packet was transmitted by the packet transmitter 200*a*. Time of reception of the each packet at the packet receiver 200*b* might then be counted from the time indicator. This time indicator can be used to calculate the packet age at the packet receiver 200*b* and thus determine whether a particular packet is received within the first threshold time delay and/or within the second threshold time delay.

There could be different ways to set the first threshold time delay.

In some aspects the first threshold time delay is set according to a play-out deadline. Hence, according to an embodiment, the first threshold time delay is set to meet a play-out deadline of the first decoded version at the packet receiver 200*b*.

In some aspects the first threshold time delay is set according to a transmitter-receiver target latency. Hence, according to an embodiment, the first threshold time delay represents an upper bound of a packet transmitter 200*a* to packet receiver 200*b* target latency. In some embodiment the threshold can be continuously adapted to the current network conditions.

There could be different ways for the packet receiver 200b to buffer the packets.

In some aspects one common buffer is used for both decoding the encoded media into the first decoded version and the second decoded version. Hence, according to an embodiment, the received packets are provided in a common jitter buffer at the packet receiver 200b before being decoded.

In some aspects different logics are used for obtaining the packets from the common buffer. Particularly, according to an embodiment, there are separate logics for obtaining the packets from the common jitter buffer for decoding the encoded media into the first decoded version and the second decoded version, respectively. The logics for obtaining the packets from the common jitter buffer for decoding the encoded media into the second decoded version retrieves more packets than the retrieving logics for obtaining the packets from the common jitter buffer for decoding the encoded media into the first decoded version.

In some aspects the logics for obtaining the packets from the common jitter buffer for decoding the encoded media into the first decoded version only obtains packets that are not too old. Hence, according to an embodiment, the logics for obtaining the packets from the common jitter buffer for decoding the encoded media into the first decoded version only obtains those packets that are received within the first threshold time delay from having been transmitted by the packet transmitter 200a.

Figure 5:
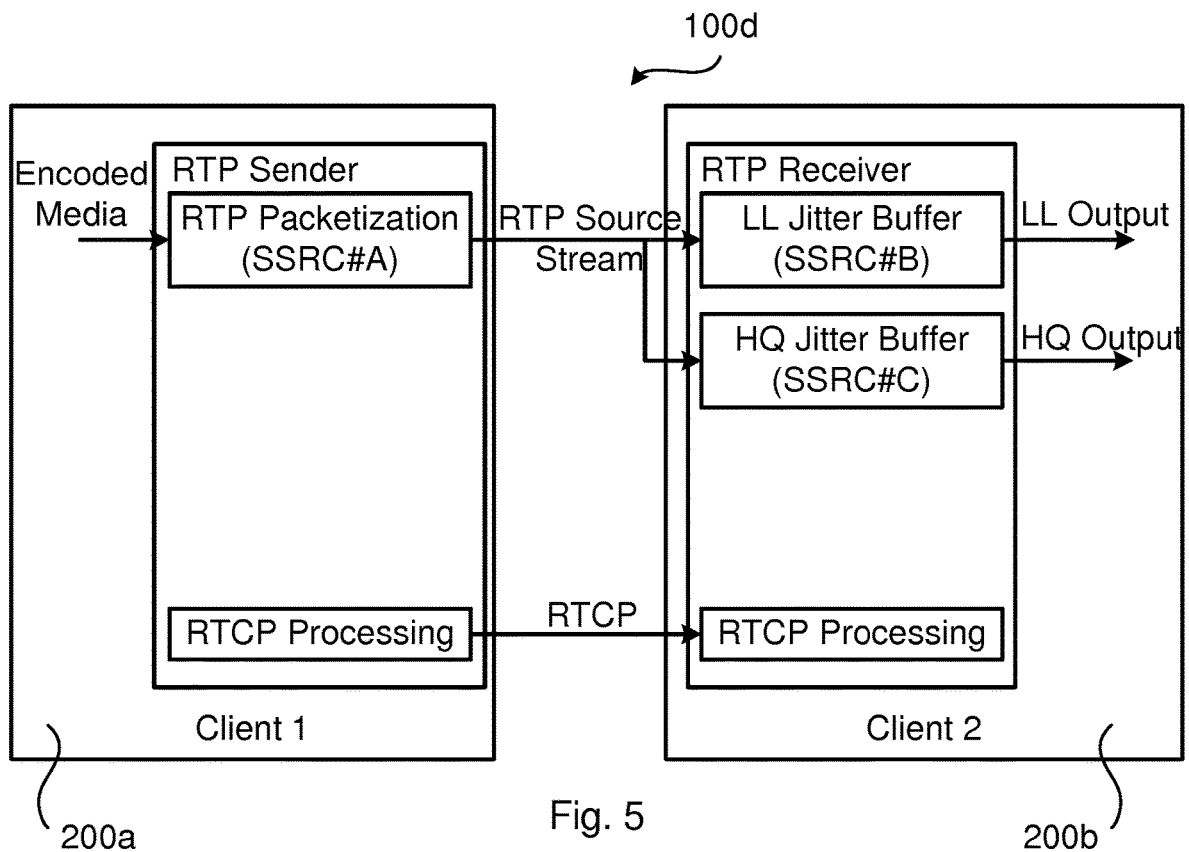

Parallel reference is now made to FIG. 5. FIG. 5 illustrates a communications network 100d where a packet transmitter 200a and a packet receiver 200b utilize a Real-Time Protocol (RTP) sender and receiver, respectively. At the packet transmitter 200a encoded media is RTP packetized and then sent to the packet receiver 200b. The sent RTP packetized media stream is using synchronization source identifier (SSRC) #A to identify this media stream.

According to the illustrative example in FIG. 5, for each source RTP stream, as identified by the SSRC (#A in this case), two copies are put in their respective jitter buffers (denoted LL and HQ for low latency and high quality, respective, in FIG. 5) for decoding the encoded media into a first decoded version and a second decoded version.

Particularly, according to an embodiment, the received packets at the packet receiver 200b are provided in a first jitter buffer (as in the LL jitter buffer in FIG. 5) from which packets used for the first decoded version are used, and in a second jitter buffer (as in the HQ jitter buffer in FIG. 5) from which packets used for the second decoded version are used.

There could be different types of first jitter buffer and second jitter buffer. In some aspects the second jitter buffer is deeper than the first jitter buffer. Hence, according to an embodiment, the first jitter buffer has a shorter buffer depth than the second jitter buffer. The first jitter buffer might thus run with a shorter buffering depth. According to an embodiment, each of the first jitter buffer and the second jitter buffer has its own individual synchronization source identifier (SSRC). Feedback reports of the jitter buffers are then provided from the packet receiver 200b to the packet transmitter 200a. The feedback reports of each respective jitter buffer then comprise the SSRC of each respective jitter buffer.

A jitter buffer controller might measure the arrival of each RTP packet and determine a minimal one way delay to the packet transmitter 200b as well as a measure of the jitter. Thus, allowing for setting a playout schedule specifying when media needs to leave the jitter buffers for decoding, and then playout or storage.

For the first jitter buffer this playout schedule might thus be set to a target that tries to meet the transmitter-to-receiver latency target. Often the latency target is set so low that not all packets arrive in time. The packets with the largest amount of jitter will be too late to meet the deadline, thus becoming so called late loss for being used for the first decoded version.

For the second jitter buffer the playout target might be set significantly later than the minimal arrival time for a given packet. By significantly later is generally referred to as several times the standard deviations for the jitter plus the time needed for the selected packet loss repair method (as might be applied if a packet is not received in time).

According to an embodiment, each of the logics uses its own individual synchronization source identifier (SSRC). Feedback reports of the jitter buffers are then provided from the packet receiver 200b to the packet transmitter 200a. The feedback reports of each respective logics then comprises the SSRC of each respective logics.

As disclosed above, there might either be one common jitter buffer or two separate jitter buffers. In the case only one common buffer is implemented the first jitter buffer and the second jitter buffer might be considered as logical buffers. The first jitter buffer and the second jitter buffer might thus either be implemented using two separate buffers or using one common data structure but with separate processing and logics for obtaining the packets from the buffer.

Using RTP and the Real-time Transport Protocol Control Protocol (RTCP) where the packet receiver 200b is represented by a single SSRC for feedback and reporting works well since those reports can focus only on the metric defined as whether the RTP packets in question arrived at the packet receiver 200b or not. For this type of metric there is no difference between the first jitter buffer and the second jitter buffer. However, this might not be sufficient if it is desired to get application level metrics, such as those metrics that can be provided by RTCP eXtended Reports (RTCP XR, as defined in RFC3611). For example the voice over Internet Protocol (VoIP) metric block (see, RFC3611) provides discard rate, end-to-end latency, as well as media quality estimates. There also exist several other block types such as Post-repair Loss (see, RFC5725), Discard Count Metrics Block (see, RFC7002), Post-Repair Loss Count Metrics Report Block (see, RFC7509), where the first jitter buffer and the second jitter buffer will have different values to report due to their different buffer lengths. To enable an RTP sender to monitor the reception performance for each jitter buffer, each jitter buffer might provide metrics using individual SSRCs. This is in FIG. 5 illustrated by SSRC #B and SSRC #C.

There could be different ways to handle packet loss at the packet receiver 200b.

According to an embodiment, the first decoded version is decoded without using forward error correction or repair packets and without being dependent on retransmissions of packets. According to another embodiment, forward error correction involving duplication of any missed packet is available during decoding of the media stream into the first decoded version. In this respect, any repair packet and/or retransmitted packet of a missing packet are available during decoding of the media stream into the first decoded version only when received within the first threshold time delay from said missing packet having been transmitted by the packet transmitter 200a. According to an embodiment, at least one of forward error correction, error concealment, repair packets, and packet retransmission is available during decoding of the media stream into the second decoded version.

Figure 6:
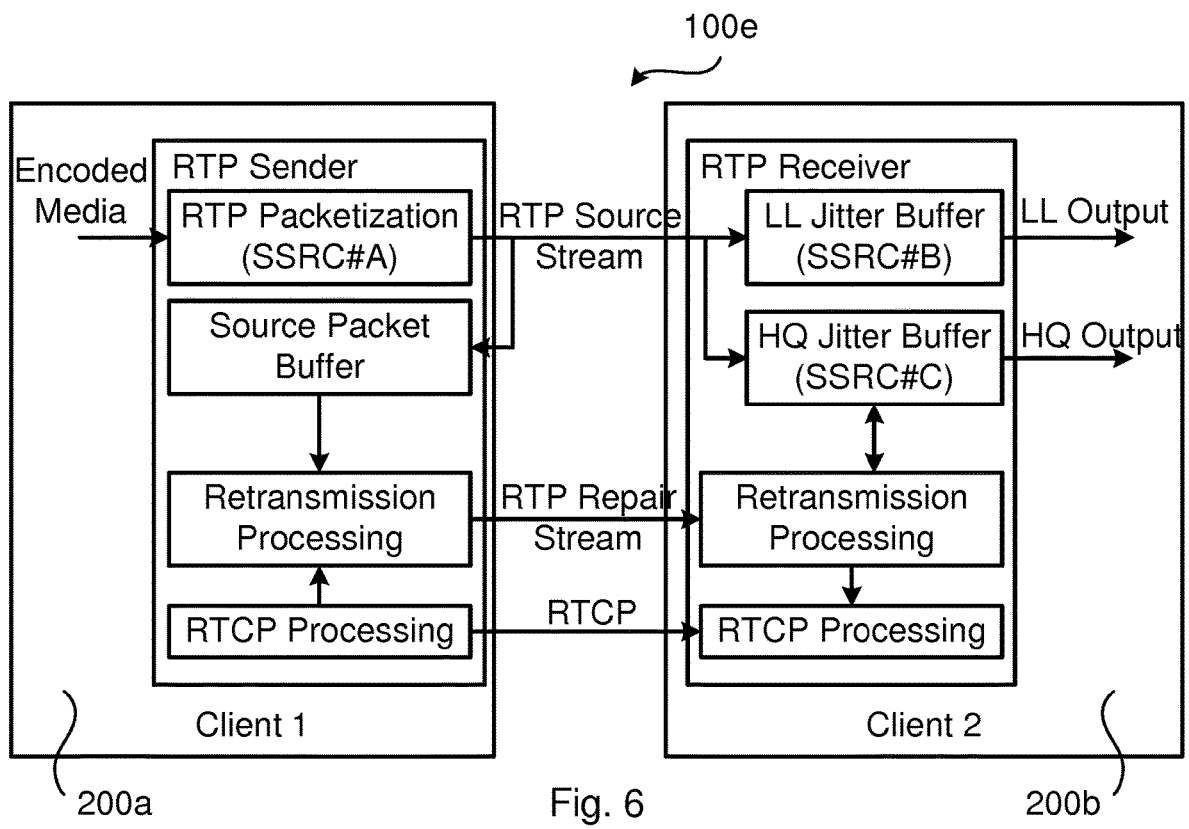

Further aspects thereto will now be disclosed with parallel reference to FIG. 6. FIG. 6 illustrates a communications network 100e where a packet transmitter 200a and a packet receiver 200b utilize an RTP sender and receiver, respectively. At the packet transmitter 200a encoded media is RTP packetized and then sent to the packet receiver 200b.

RTP Retransmissions (see, RFC4588) might be efficient for packet repair, for example assuming that there is sufficient time to perform the packet repair operation. Several round-trip times between packet transmitter 200a and packet receiver 200b might be required to achieve a low failure rate of any repair. When the packet receiver 200b notices that a packet has not arrived, either through a gap in sequence number or indication in RTCP Sender Reports that more packets have been sent than received, an RTCP Negative Acknowledgement (NACK) Feedback message may be sent. Hence, according to an embodiment, at least for the second decoded version a NACK feedback message is transmitted to the packet transmitter 200a upon detection of a missing packet. A guard time might be used to not perform unnecessary requests if reordering has occurred.

A packet transmitter 200a receiving a NACK message checks if the missing RTP packet is still in its source packet buffer. If this is the case, the packet transmitter 200a might, in a retransmission processing module, create an RTP Repair packet by encapsulating the missing RTP payload in the Retransmission Payload Format (RTX) (see, RFC4588) and then transmitting the missing packet on a separate RTP repair stream. Upon reception of the repair packet in its own retransmission processing module, the packet receiver 200b puts the payload and associated header information into the jitter buffer. In case a loss of a repair packet is detected (using the same methods as for source packets or timeout), the packet receiver 200b might report the packet as still missing by using a new RTCP NACK feedback packet. In cases where sufficient amount of time is available before the packet needs to be forwarded to the next processing step, several retransmission attempts can be performed, resulting in a very low probability of packet losses after packet repair.

According to the illustrative example in FIG. 6, RTP retransmission is applied only to the second (HQ) jitter buffer since it is in some embodiments assumed that the first (LL) jitter buffer does not have enough buffer depth for even a single retransmission attempt to reach this jitter buffer prior to the media playout. Instead the retransmission processing module monitors the second jitter buffer, and reports missing packets to enable retransmission of those.

There could be additional types of FEC, for example when applied to several blocks at a time.

In this respect, by applying a FEC mechanism configured to utilize a deep jitter buffer (such as the second jitter buffer) and with long allowed threshold time delay (such as the second threshold time delay) more efficient packet repair might be applied. As an example, FEC mechanisms that can protect against burst losses can be applied. Such mechanisms include 2D XOR based mechanisms and other block-based codes (see, RFC6682). Particularly, according to an embodiment, the forward error correction involves interleaving and/or permuting the packets.

Figure 7:
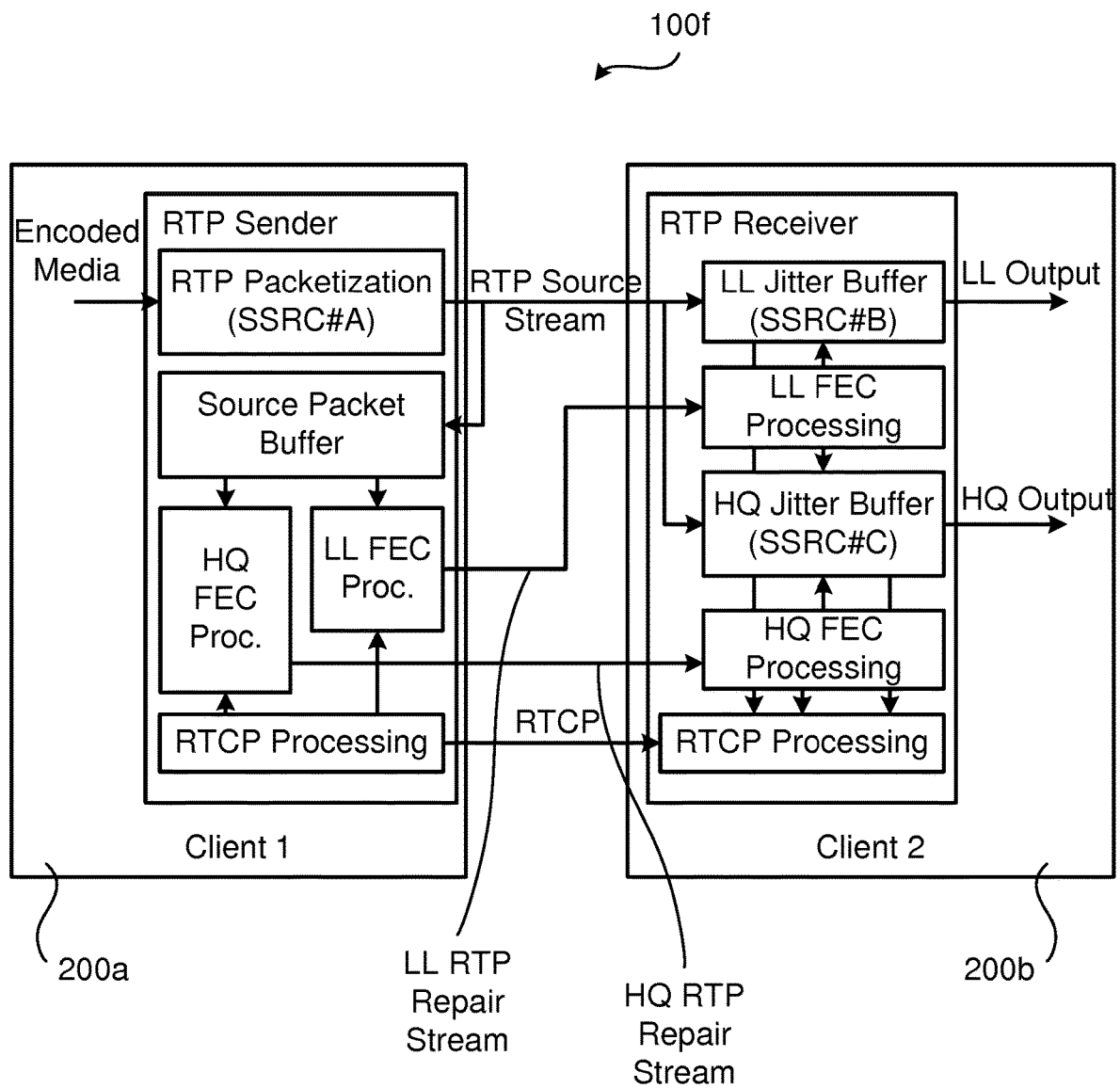

FIG. 7 illustrates a communications network 100f where a packet transmitter 200a and a packet receiver 200b utilize an RTP sender and receiver, respectively. At the packet transmitter 200a encoded media is RTP packetized and then sent to the packet receiver 200b. In the illustrative example of FIG. 7 the packet transmitter 200a produces two different RTP Repair Streams (denoted LL RTP Repair Stream and HQ RTP Repair Stream), one by a HQ FEC processing module and another by a LQ FEC processing module, where only the LL RTP repair stream is intended to be usable by the first (LL) jitter buffer. The LL RTP repair stream is used by both the first jitter buffer and the second jitter buffer, however the second jitter buffer will also be able to use repair packets that are received too late for the first jitter buffer, as processed by a HQ FEC processing module in the packet receiver 200b. Hence, according to an embodiment, two separate streams of repair packets, and/or packet retransmissions are available during decoding of the media stream. Both of the two separate streams are available during decoding of the media stream into the second decoded version, whereas only one of the two separate streams are available during decoding of the media stream into the first decoded version.

The HQ RTP repair stream might comprise RTP packets generated using a larger FEC source block. Using a FEC code that can repair burst losses achieves both improved repair properties as well as better efficiency with less FEC overhead compared to repair performance. The application of FEC for packet repair, compared to packet retransmission, might be suitable in cases where there are many packet receivers 200b that should receive the media stream with high quality, such as when multicast or broadcast is used.

According to an embodiment, at least one RTCP packet comprises information defining which jitter buffer policy is used for the SSRC comprised in the respective feedback report. As disclosed above, when an RTP session includes multiple packet receivers with either low latency or high-quality reception strategies, or alternatively a single packet receiver implementing both strategies, it can become difficult to compare the results from the RTCP reports provided by these packet receivers and their reported SSRCs. To avoid having to rely on heuristics based on the measurements, an RTP/RTCP extension or a signaling extension might be used to declare which strategy a particular SSRC is following when reporting. In some aspects, for RTP/RTCP in-band signaling, an RTCP SDES item is defined. Thus, according to an embodiment, the information defining which jitter buffer policy is used is provided in an RTCP SDES item.

Figure 8:
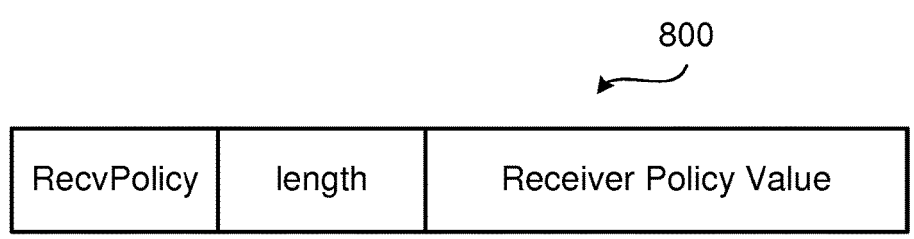
FIG. 8 schematically illustrates an RTCP SDES item according to an embodiment.

The frequency of repeating the RTCP SDES item in an RTP session could be controlled to appropriate levels based on the RTP session's participating devices' behavior in joining and leaving the RTP session. An example of such an RTCP SDES item is illustrated at 800 in FIG. 8. The RecvPolicy field is an 8-bit identifier assigned by the Internet Assigned Numbers Authority (IANA) to identify the SDES item, as defined in RFC3550. The length field denotes the length of the Receiver Policy Value field in bytes (0-255). This is also defined in RFC355. The field value given as an UTF-8 string. The Receiver policy value field has limited set of values that do not require more than a single character to encode. A policy expressed by the first character in the string may however define to add additional string encoded values after its initial policy value. Each policy defines such extension characters. Table 1 gives an example of policy values and the associated policy.

TABLE 1

Policy values and associated policies

| Value | Policy |
|---|---|
| 0 | Minimal Jitter Buffer with upper limit to size of jitter. The buffer may adapt to the jitter variations with the intention to reduce packet loss due to jitter. However, the buffer will not adapt beyond the given value in milliseconds. The value is encoded as characters following the initial o. Thus, a buffer with this policy using a maximum jitter adaptation of 15 ms is encoded as: "015" |
| 1 | Adaptive Jitter buffer without upper limit. The jitter buffer adapts its buffer depth to allow for the majority, e.g. 95% of packets shall arrive within the adapted buffer depth. No upper limit exists. |
| 2 | Buffer with fixed buffer depth in time. The buffer will maintain a fixed buffer depth. The buffer depth is expressed in ms and encoded in the following character. For example, the SDES string value for a buffer with this policy and a buffer depth of 2 seconds (2000 ms) will be "22000". |
| 3 | Virtually Infinitive deep buffer. The receiver captures all received packets and has no real time consumer of the data. Thus, even extremely delayed information can, at capture time or in a later processing step, be correctly integrated into the stored stream. |
| X | Reserved for extensions of additional policies beyond a single character, starting with X and an additional character encoding the actual policy. |

For comparatively smaller RTP sessions with fully signaled participant lists and where no or little dynamic behavior of the SSRCs exists, the SSRCs and their policy could be signaled by a signaling protocol extension. For applications using the Session Description Protocol (SDP; see RFC4566) with Offer/Answer mechanisms (see, RFC3264) such as in the Session Initiation Protocol (SIP; see RFC3261) to negotiate the session it is possible for an endpoint to declare their own SSRC's receiver policies using Source-Specific Media Attributes in the SDP (see, RFC5576). This would, as an example, enable a packet receiver 200b that has two buffers to declare this in the SDP for an audio source in the following way:

m=audio 49168 RTP/AVP 0
a=ssrc:314159 recvpolicy:020//A minimal buffer with max 20 ms
a=ssrc:987654 recvpolicy:23000//A time-limited 3 seconds buffer As the skilled person understands, there might be alternative ways to both encode and transport the policy that a particular packet receiver 200b uses for the SSRC providing RTCP reporting.

There might be different uses of the first decoded version and the second decoded version.

As disclosed above, the first decoded version might be for real-time playout. Particularly, according to an embodiment the packet receiver 200b is configured to perform (optional) step S106:

S106: The packet receiver 200b plays out the first decoded version.

In some aspects there are media streams received from multiple packet transmitters 200a. These might then be decoded and played out without any application of dedicated synchronization. Particularly, according to an embodiment, a further first decoded version of a further decoded media stream is played out together with the first decoded version. The first decoded versions are played out without being mutually synchronized in time. In more detail, the first decoded version might be intended to have so low latency that no synchronization is beneficial. Any attempt to synchronize incoming media streams might thus only result in them being played even later than any local loopback.

As disclosed above, the second decoded version might be for later storage. Particularly, according to an embodiment the packet receiver 200b is configured to perform (optional) step S108:

S108: The packet receiver 200b stores the second decoded version.

In some aspects the media streams received from multiple packet transmitters 200a are time-wise synchronized with each other before storage. Particularly, according to an embodiment, a further second decoded version of a further decoded media stream is stored together with the second decoded version. The second decoded versions are stored after having been mutually synchronized in time.

In more detail, the second decoded version might be intended for storage and only be played out later. This would allow ample time for synchronizing in time the different second decoded versions before storage, or at least before later play out. In some aspects there is access to a master clock in order to achieve synchronization in time. The different packet transmitters 200a might for this purpose also have well synchronized master clocks to enable them to be used as the primary source on how to relate the different media streams. When the RTP is used there are facilities in RTCP Sender Reports (see, RFC3550) to provide a mapping between the RTP stream's timestamp to a master clock given in Network Time Protocol (NTP) format (see, RFC5905). Most types of master clocks can be converted into the NTP format. RTP Clock Source Signaling (see, RFC7273) can be used to inform the session participants (such as the packet transmitter 200a and the packet receiver 200b) of what type of master clock is used and if they are likely to be sufficiently synchronized with the other packet transmitters. If synchronized master clocks are not available then the packet receiver 200b might have to infer the relation of the different packet transmitters' master clocks by observing packet arrival and protocol information, such as measured round-trip times (RTTs).

Figure 9:
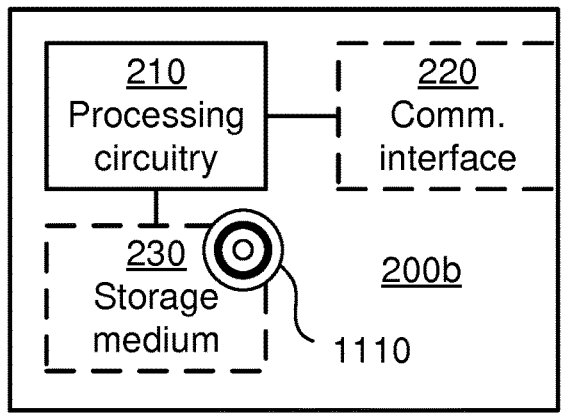
FIG. 9 is a schematic diagram showing functional units of a packet receiver according to an embodiment.

FIG. 9 schematically illustrates, in terms of a number of functional units, the components of a packet receiver 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the packet receiver 200b to perform a set of operations, or steps, S102-S108, as disclosed above. For example, the storage medium 230 may store the set of operations, and the processing circuitry 210 may be configured to retrieve the set of operations from the storage medium 230 to cause the packet receiver 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The packet receiver 200b may further comprise a communications interface 220 at least configured for communications at least with the packet transmitter 200a. As such the communications interface 220 may comprise one or more transmitters and receivers, comprising analogue and digital components. The processing circuitry 210 controls the general operation of the packet receiver 200b e.g. by sending data and control signals to the communications interface 220 and the storage medium 230, by receiving data and reports from the communications interface 220, and by retrieving data and instructions from the storage medium 230. Other components, as well as the related functionality, of the packet receiver 200b are omitted in order not to obscure the concepts presented herein.

Figure 10:
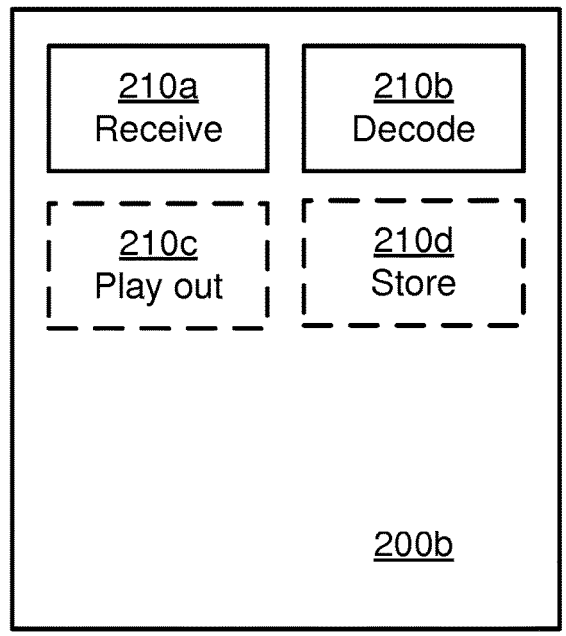
FIG. 10 is a schematic diagram showing functional modules of a packet receiver according to an embodiment.

FIG. 10 schematically illustrates, in terms of a number of functional modules, the components of a packet receiver 200b according to an embodiment. The packet receiver 200b of FIG. 10 comprises a number of functional modules; a receive module 210a configured to perform step S102, and a decode module 210b configured to perform step S104. The packet receiver 200b of FIG. 10 may further comprise a number of optional functional modules, such as any of a play out module 210c configured to perform step S106, and a store module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes the packet receiver 200b perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The packet receiver 200b may be provided as a standalone device or as a part of at least one further device. Examples of where the packet receiver 200b might be provided have been given above. Alternatively, functionality of the packet receiver 200h may be distributed between at least two devices, or nodes. Thus, a first portion of the instructions performed by the packet receiver 200b may be executed in a first device, and a second portion of the of the instructions performed by the packet receiver 200b may be executed in a second device; the herein disclosed embodiments are not limited to any particular number of devices on which the instructions performed by the packet receiver 200b may be executed. Hence, the methods according to the herein disclosed embodiments are suitable to be performed by a packet receiver 200b residing in a cloud computational environment. Therefore, although a single processing circuitry 210 is illustrated in FIG. 9 the processing circuitry 210 may be distributed among a plurality of devices, or nodes. The same applies to the functional modules 210a-210d of FIG. 10 and the computer program 1120 of FIG. 11 (see below).

Figure 11:
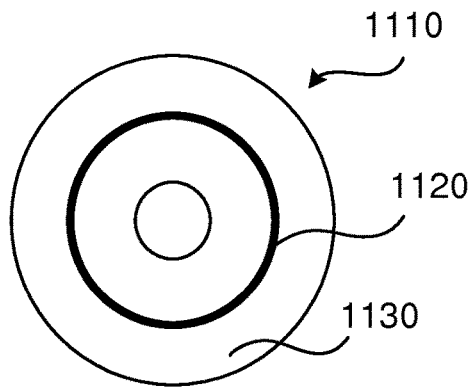
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for decoding a media stream, the method being performed by a packet receiver, the method comprising:
   receiving packets, the packets having been transmitted by a packet transmitter, the packets defining the media stream and each packet comprising encoded media;
   decoding the encoded media into at least a first decoded version and a second decoded version;
   wherein for the first decoded version only a subset of the packets decoded for the second decoded version are decoded;
   wherein the subset includes only those of the packets that are received within a first threshold time delay from having been transmitted by the packet transmitter;
   wherein the received packets are provided in a common jitter buffer at the packet receiver before being decoded;
   wherein there are separate logics for obtaining the packets from the common jitter buffer for decoding the encoded media into the first decoded version and the second decoded version, respectively; and
   wherein the logics for obtaining the packets from the common jitter buffer for decoding the encoded media into the second decoded version retrieves more packets than the retrieving logics for obtaining the packets from the common jitter buffer for decoding the encoded media into the first decoded version.

2. The method of claim 1, wherein for the second decoded version, also packets received later than the first threshold time delay from having been transmitted by the packet transmitter are decoded.

3. The method of claim 1:
wherein for the second decoded version, only those of the packets that are received within a second threshold time delay from having been transmitted by the packet transmitter are decoded;
wherein the second threshold time delay is longer than the first threshold time delay.

4. The method of claim 1:
wherein each packet is indicative of a time indicator specifying when in time the packet was transmitted by the packet transmitter; and
wherein time of reception of the each packet at the packet receiver is counted from the time indicator.

5. The method of claim 1, wherein the first threshold time delay is set to meet a playout deadline of the first decoded version at the packet receiver.

6. The method of claim 1, wherein the first threshold time delay represents an upper bound of a packet transmitter to packet receiver target latency.

7. The method of claim 1, wherein the logics for obtaining the packets from the common jitter buffer for decoding the encoded media into the first decoded version only obtains those packets that are received within the first threshold time delay from having been transmitted by the packet transmitter.

8. The method of claim 1:
wherein each of the logics uses its own individual synchronization source identifier (SSRC);
wherein feedback reports of the jitter buffers are provided from the packet receiver to the packet transmitter; and
wherein the feedback reports of each respective logics comprises the SSRC of the each respective logics.

9. The method of claim 8, wherein each respective feedback report comprises information defining which jitter buffer policy is used for the SSRC comprised in the respective feedback report.

10. The method of claim 9, wherein the information defining which jitter buffer policy is used is provided in a Real-time Transport Protocol Control Protocol (RTCP) Source Description (SDES) item.

11. The method of claim 1, wherein any repair packet and/or retransmitted packet of a missing packet are available during decoding of the media stream into the first decoded version only when received within the first threshold time delay from the missing packet having been transmitted by the packet transmitter.

12. The method of claim 1, wherein forward error correction, error concealment, repair packets, and/or packet retransmission is available during decoding of the media stream into the second decoded version.

13. The method of claim 1, further comprising:
playing out the first decoded version; and/or
storing the second decoded version.

14. A packet receiver for decoding a media stream, the packet receiver comprising:
processing circuitry;
memory containing instructions executable by the processing circuitry whereby the packet receiver is operative to:
receive packets, the packets having been transmitted by a packet transmitter, the packets defining the media stream and each packet comprising encoded media; and
decode the encoded media into at least a first decoded version and a second decoded version;
wherein for the first decoded version only a subset of the packets decoded for the second decoded version are decoded;
wherein the subset includes only those of the packets that are received within a first threshold time delay from having been transmitted by the packet transmitter;
wherein the received packets are provided in a common jitter buffer at the packet receiver before being decoded;
wherein there are separate logics for obtaining the packets from the common jitter buffer for decoding the encoded media into the first decoded version and the second decoded version, respectively; and
wherein the logics for obtaining the packets from the common jitter buffer for decoding the encoded media into the second decoded version retrieves more packets than the retrieving logics for obtaining the packets from the common jitter buffer for decoding the encoded media into the first decoded version.

15. A non-transitory computer readable recording medium storing a computer program product for decoding a media stream, the computer program product comprising program instructions which, when run on processing circuitry of a packet receiver, causes the packet receiver to:
receive packets, the packets having been transmitted by a packet transmitter, the packets defining the media stream and each packet comprising encoded media;
decode the encoded media into at least a first decoded version and a second decoded version;
wherein for the first decoded version only a subset of the packets decoded for the second decoded version are decoded;
wherein the subset includes only those of the packets that are received within a first threshold time delay from having been transmitted by the packet transmitter;
wherein the received packets are provided in a common jitter buffer at the packet receiver before being decoded;
wherein there are separate logics for obtaining the packets from the common jitter buffer for decoding the encoded media into the first decoded version and the second decoded version, respectively; and
wherein the logics for obtaining the packets from the common jitter buffer for decoding the encoded media into the second decoded version retrieves more packets than the retrieving logics for obtaining the packets from the common jitter buffer for decoding the encoded media into the first decoded version.

\* \* \* \* \*